United States Patent [19]
Turnbull et al.

[11] 3,985,841
[45] Oct. 12, 1976

[54] METHOD AND MEANS FOR PRODUCING SOLID EVACUATED MICROSPHERES OF HYDROGEN

[75] Inventors: Robert J. Turnbull, Urbana; Christopher A. Foster, Champaign, both of Ill.; Charles D. Hendricks, Livermore, Calif.

[73] Assignee: The United States of America as represented by the United States Energy Research and Development Administration, Washington, D.C.

[22] Filed: Nov. 6, 1975

[21] Appl. No.: 629,244

[52] U.S. Cl. ................................. 264/9; 176/1; 252/301.1 R; 264/.5; 264/28
[51] Int. Cl.² .................................. C01B 4/00
[58] Field of Search ............... 252/301.1 R; 176/1; 264/.5, 9, 28

[56] References Cited
OTHER PUBLICATIONS

Hendricks, C. D., "Program to Develop the Techniques of Generation and Control of Cryogenic Material Particles for Use on Fusion Systems", c00–2234–1.

Clark et al. "Laser-Driven Implosion... Condition", *Physical Review Letters*, vol. 30, No. 3, (Jan. 15, 1973), pp. 89–92.
Nuclear Science Abstracts, vol. 30. No. 18447, (Oct. 1974).

*Primary Examiner*—Benjamin R. Padgett
*Assistant Examiner*—Deborah L. Kyle
*Attorney, Agent, or Firm*—Dean E. Carlson; Arthur A. Churm; Paul A. Gottlieb

[57] ABSTRACT

A method is provided for producing solid, evacuated microspheres comprised of hydrogen. The spheres are produced by forming a jet of liquid hydrogen and exciting mechanical waves on the jet of appropriate frequency so that the jet breaks up into drops with a bubble formed in each drop by cavitation. The drops are exposed to a pressure less than the vapor pressure of the liquid hydrogen so that the bubble which is formed within each drop expands. The drops which contain bubbles are exposed to an environment having a pressure just below the triple point of liquid hydrogen and they thereby freeze giving solid, evacuated spheres of hydrogen.

4 Claims, 1 Drawing Figure

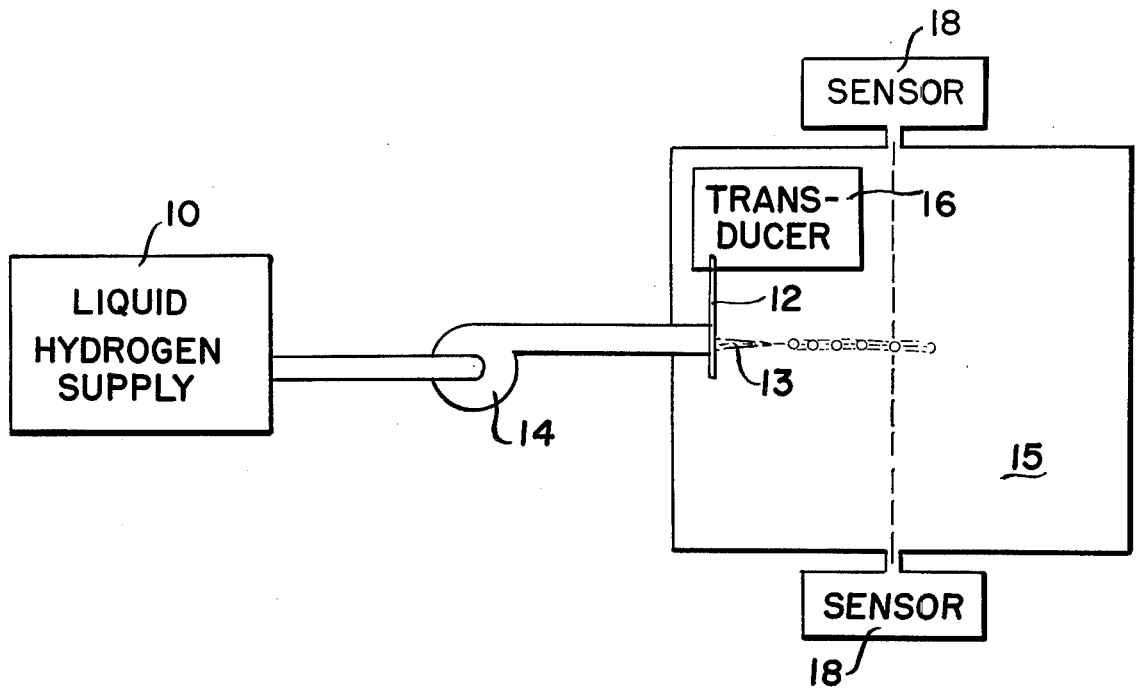

METHOD AND MEANS FOR PRODUCING SOLID EVACUATED MICROSPHERES OF HYDROGEN

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

An energy source currently under active investigation is laser fusion. In laser fusion a pellet of deuterium-tritium is imploded by intense beams of laser light. If the pellets can be imploded to 10,000 times their normal densities, efficient generation of fusion energy can be obtained. If the pellets are hollow rather than solid, the implosion should require significantly less peak laser power. It is therefore desirable to be able to produce small, evacuated, solid spheres of liquid hydrogen for use as laser fusion targets.

It is therefore an object of this invention to provide a process for the production of small, evacuated microspheres of hydrogen.

Another object of this invention is to produce such evacuated microspheres of hydrogen.

SUMMARY OF THE INVENTION

Production of solid, evacuated microspheres of hydrogen is facilitated by forming a jet of liquid hydrogen. The jet has imposed upon it a mechanical wave having a desired frequency and amplitude at which the liquid hydrogen jet will break up into uniformly sized and distributed drops. The environment in which the breaking up of the jet occurs is at such a temperature and pressure and the mechanical wave on the jet is of such amplitude and frequency that a bubble forms within each drop. The pressure of the environment where the bubble forms must be less than the vapor pressure of the liquid hydrogen so that the bubble will expand. The drop with the bubble is then exposed to a pressure slightly below the triple point of hydrogen thereby freezing the drop to produce the desired solid, evacuated microsphere of hydrogen.

BRIEF DESCRIPTION OF THE DRAWING

The drawing is of an apparatus which may be used to practice the process herein disclosed.

DETAILED DESCRIPTION OF THE PREFERRED EMBODIMENT

Referring to the drawing, there is shown an apparatus which may be used to practice the disclosed method of producing solid, evacuated microspheres of hydrogen. Liquid hydrogen is provided by a liquid hydrogen supply 10 and and should be of very high purity to avoid fouling the equipment. The liquification may be done, for example, by passing gaseous hydrogen through a series of heat exchangers using liquid helium as the coolant. Liquid hydrogen then flows through a nozzle or orifice to form jet 13. The orifice may simply be a glass capillary, a plate with a hole drilled into it or a hypodermic syringe. Means such as a gas pressure system provides sufficient pressure to form the jet. A pump 14 could also be used. The pressure applied to the liquid hydrogen should be sufficient to form and maintain the integrity of a cylindrical jet extending from the plane of plate 12. The size of the orifice and the velocity of the jet are the variables for determining the quality of the jet formed. Generally, for a 50 micrometer diameter nozzle differential pressures from 1 pound per square inch absolute to 3 pounds per square inch absolute produced a satisfactory jet.

The jet 13 is formed within a chamber 15 wherein the pressure is controlled. Since the temperature of the gas in chamber 15 should be in the cryogenic region, chamber 15 is limited to containing either helium gas or hydrogen gas or a combination of the two since only these two gases are capable of being gaseous at such low temperatures.

A liquid jet, such as the hydrogen jet described, is unstable and will break up into drops. To control this breakup, so that drops of a desired uniform size and distribution are formed, it is necessary to mechanically excite waves upon the jet. This may be done in a variety of ways. In the drawing, a transducer 16 is coupled to plate 12 and causes the orifice to vibrate at the desired frequency. Another means for exciting the jet could be to position a diaphragm upstream from the orifice and vibrate the diaphragm. This produces pressure waves in the fluid entering the orifice. The excitation of the jet produces a wave on the jet which grows in amplitude as driven by the surface tension of the jet. Considering the jet as a column or cylinder held together by the surface tension of the fluid, the wave imposed on the jet induces the surface tension to break the cylinder into small segments. The optimum frequency of excitation depends on the density of the fluid, the radius of the jet and the surface tension of the liquid. The optimum frequency depends inversely on the density and radius and directly upon the surface tension. The jet can be induced to break up over a wide range of frequencies.

The amplitude of the wave is also a variable. Too low an amplitude will not produce the desired breakup and cavitation while too high an amplitude will cause the drops to be disintegrated. The desired breakup of the jet should be done so that drops of uniform size and distribution are developed. Detection of drop character can be by eyeballing or microphotographic techniques. In addition, a photocell electric sensor 18 could be used to detect drop position or the drops could be charged and then the sensing of their presence could be done electronically.

If the pressure or a liquid jet is less than the vapor pressure of the liquid jet at the temperature of the jet, there is a critical radius for any bubbles within the liquid, $r_c$, at which bubbles with a radius larger than $r_c$ grow in size due to the evaporation of the liquid into the bubble. The critical radius is given by the expression $$r_c = 2\ \sigma/(P_v - P)$$

where $\sigma$ is the surface tension, $p_v$ is the vapor pressure of the liquid at that temperature and $p$ is the hydrostatic pressure imposed on the liquid. The excitation of the jet produces waves on the jet and regions of low instantaneous pressure in the jet. In these regions of low pressure, cavitation nuclei form and begin to grow and, if they reach the critical radius, the bubbles continue to grow. For example, if the external pressure on the jet in the atmosphere in which the jet is formed is about 70 Torr and the frequency of excitation is 63,000hz so that uniformly sized and distributed drops are formed, it was observed that with a temperature of the liquid hydrogen at 14.7° K no bubbles formed. However, at 15.3° K the vapor pressure of the liquid is 110 Torr resulting in a bubble radius of 1.1 micrometer and the desired bubbles formed. A temperature of 16.3° K produced bubbles so large that they broke through the liquid shell shattering the hollow drop. The desired condition of the liquid of the jet is that it is slightly superheated. Thus, the rate of expansion of the bubble needs to be controlled because if the expansion occurs too quickly, the drops will coalesce again. By controlling the temperature of the liquid hydrogen the rate of expansion is controlled. By utilizing the proper frequency of excitation and the proper temperature the proper breakup of the drops and the desired rate of expansion is ensured.

Formation of the solid sphere by freezing of the liquid drops with the desired bubble can be done in two ways. The freezing may take place in chamber 15 in which the drops are formed by having the desired pressure of the environment less than the triple point pressure of hydrogen. At such a pressure the drops freeze with the gaseous hydrogen of the bubble condensing on the sphere wall thereby producing solid evacuated microspheres, i.e. spheres having a vacuum within the outer solid shell. Alternately evaporation of the drops in chamber 15 can be prevented by having the pressure therein at the triple point. The drops can then be extracted through a small tube into a second chamber. In the second chamber the pressure may be reduced below the triple point giving greater pressure control. This is because the breakup of the jet which is determined by the pressure in the first chamber is not a limiting factor in the second chamber. Thus, a greater range of pressures may be utilized with a second chamber.

Using the method herein described with a 50µ m orifice diameter, microspheres 50 to 200 microns diameter with wall thickness as low as about 10 microns were produced. Of course depending upon orifice diameter, among other things, other sizes of microspheres are realizable. These spheres were of high purity hydrogen on at least 99.9% pure. Of course, isotopes of hydrogen and mixtures thereof are readily usable in this process. The change in the operating conditions are according to the guidelines established. For example, the triple point of deuterium is about 18° K and 128.6 Torr, and that of tritium 28° K and 162 Torr so that these would be the benchmark temperatures and pressures for controlling bubble expansion. Likewise, the pressure in which the jet forms to induce expansion of bubbles will be determined according to the vapor pressure of the liquid. Mixtures of the isotopes require determination of their triple point and their vapor pressures by empirical means.

The embodiments of the invention in which an exclusive property or privilege is claimed are defined as follows:

1. A method for producing solid, evacuated microspheres comprised of hydrogen, including the steps of:
   a. forming a jet of liquid hydrogen;
   b. exciting mechanical waves on the jet to induce said jet to break up into drops and to induce bubbles to form within said drops;
   c. subjecting said drops with bubbles therein to a pressure less than the vapor pressure of said liquid hydrogen so that said bubbles expand at a desired rate; and
   d. freezing said drops thereby forming solid, evacuated microspheres of hydrogen.

2. The method of claim 1 further including the step of slightly superheating said liquid hydrogen prior to forming said jet.

3. The method of claim 2 wherein said freezing includes subjecting said drops with bubbles to a pressure less than the triple point pressure of hydrogen so that said drops freeze prior to bursting and so that gaseous hydrogen within said bubbles condenses thereby producing solid evacuated microspheres of hydrogen.

4. The method of claim 3 wherein said exciting said jet causes cavitation nuclei to form in said drops, said cavitation nuclei being said bubbles.

* * * * *